Figure 1:
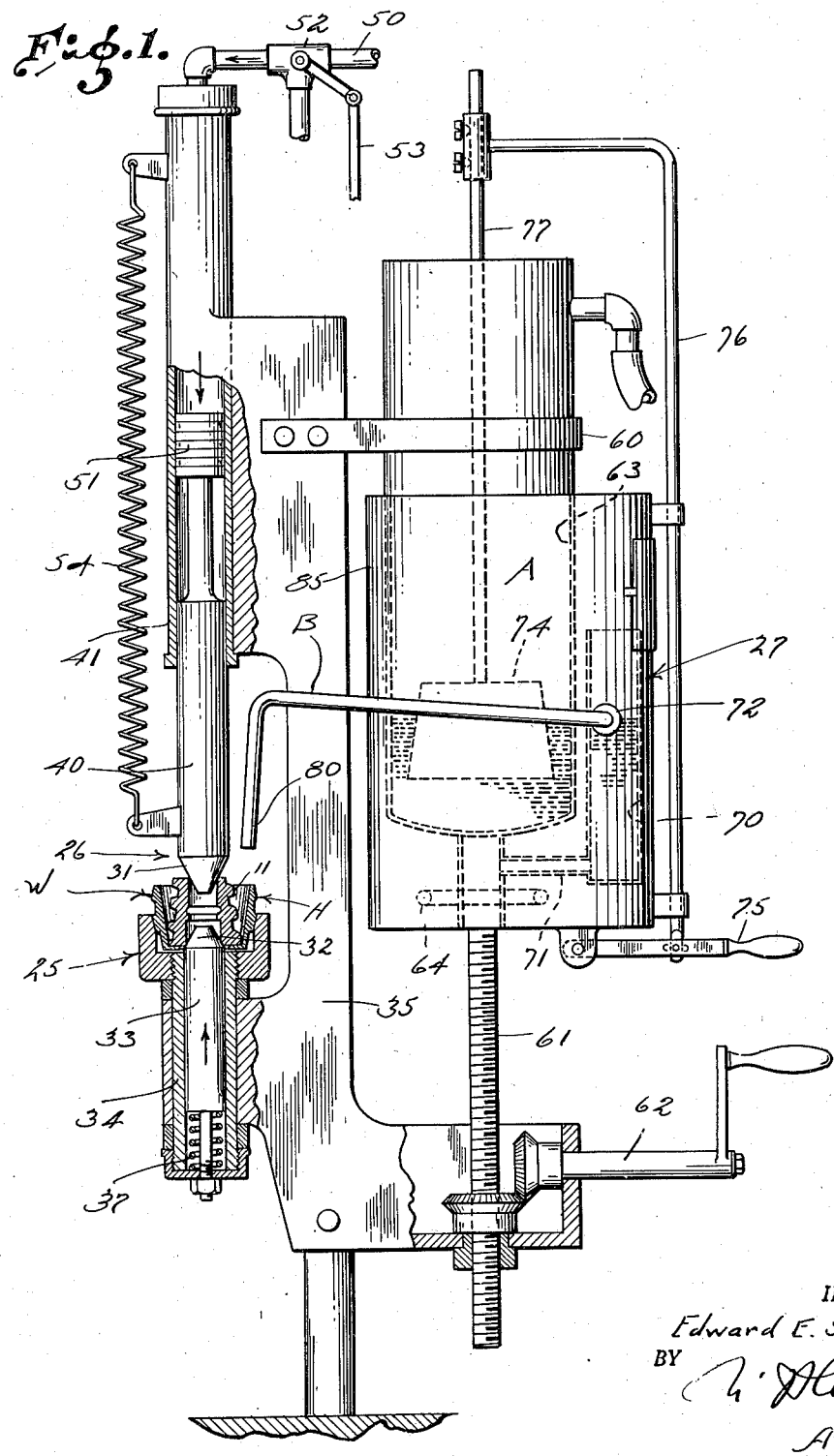

March 1, 1949.  E. E. STEVENSON  2,463,065
METHOD FOR MOUNTING WORK IN HOLDERS
Filed May 22, 1944  2 Sheets-Sheet 1

INVENTOR.
Edward E. Stevenson
BY
Attorney

March 1, 1949.  E. E. STEVENSON  2,463,065
METHOD FOR MOUNTING WORK IN HOLDERS
Filed May 22, 1944  2 Sheets-Sheet 2

INVENTOR.
Edward E. Stevenson
BY
Attorney

Patented Mar. 1, 1949

2,463,065

UNITED STATES PATENT OFFICE 2,463,065

METHOD FOR MOUNTING WORK IN A HOLDER

Edward E. Stevenson, Whittier, Calif., assignor to Globe Oil Tools Company, Los Nietos, Calif., a corporation of California Application May 22, 1944, Serial No. 536,754

2 Claims. (Cl. 51—290)

This invention has to do with a method for mounting work in a holder and it is a general object of the invention to provide a simple, effective and commercially practical method for handling work that is difficult or impractical to handle with ordinary tools or equipment.

There are numerous situations where machine operations such as grinding or turning are required on parts or work difficult to mount accurately and effectively. In mounting some work extreme accuracy is required while in other cases the work may be delicate or it may be shaped so that it is extremely difficult to grip it effectively for holding during use or handling in a machine.

The usual methods and equipment for handling work, such as I refer to, involve chucks or special fixtures, all of which are subject to inaccuracy and are frequently ineffective and unsuited for certain classes of work. The usual work holding chucks involve a plurality of jaws that hold work with reasonable accuracy if the work presents true, finished parts to be engaged by the jaws, but when the work is irregular or oddly shaped it is usually necessary that it be individually mounted and adjusted by a skillful operator with a resultant loss of time.

It is a general object of my present invention to provide a method for mounting a unit of work in a holder so that it is firmly and accurately held in a predetermined position in the holder quite regardless of irregularities or shape that would make it difficult and impractical to handle in the usual chuck, or the like. By my present invention I mount the work in a holder so that it is accurately and firmly supported therein and the holder is such that it can be readily and accurately mounted in a suitable machine such as a grinder or lathe.

It is another object of my invention to provide a method of mounting work which can be carried out by ordinary workmen without the exercise of great skill or care and without the slow, tedious operations that characterize the accurate mounting of work in a chuck, or the like.

It is another object of my invention to provide a method of the character above referred to which can be carried out rapidly and in a manner making the method practical for quantity production operations.

Figure 2:
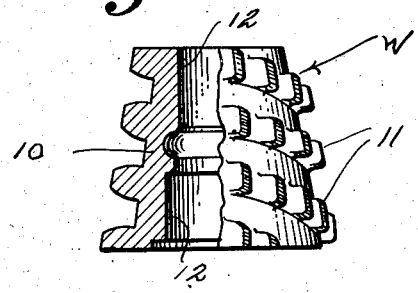
Figure 3:
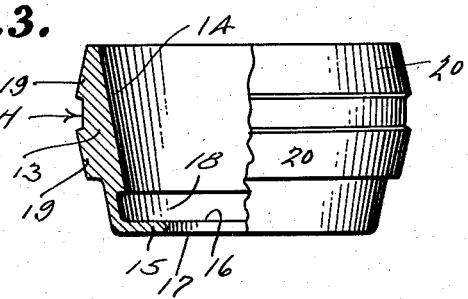
Figure 4:
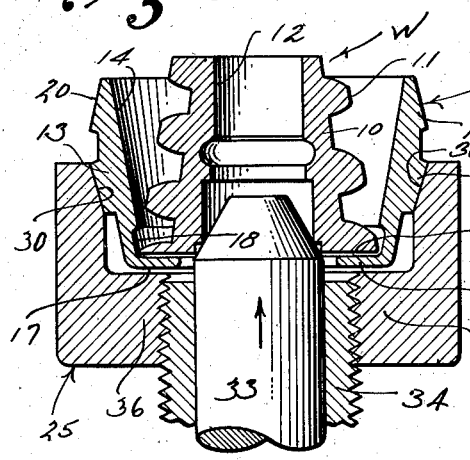
Figure 5:
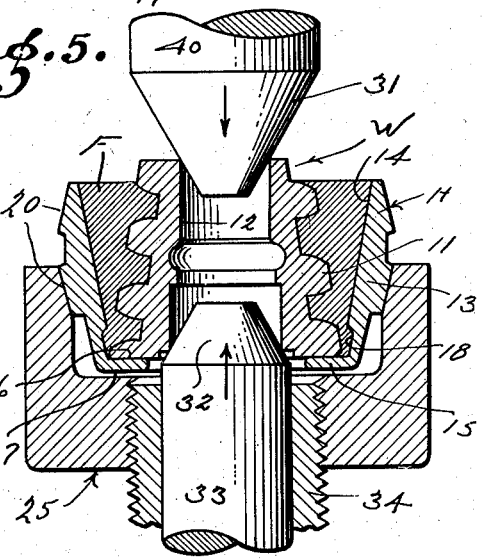
Figure 7:
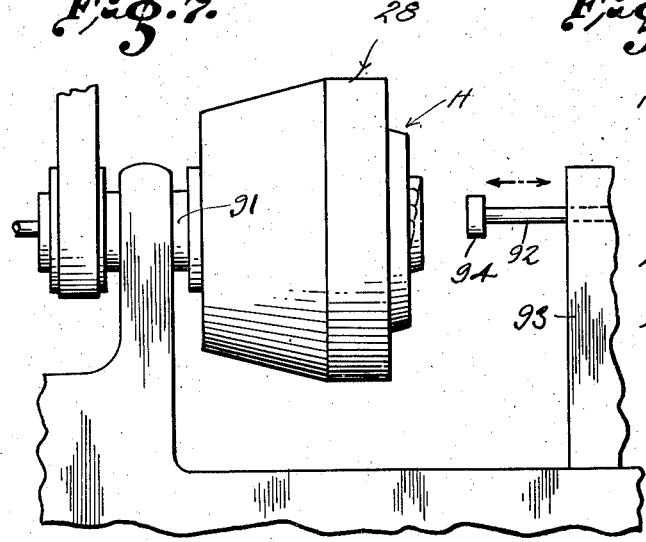
Figure 6:
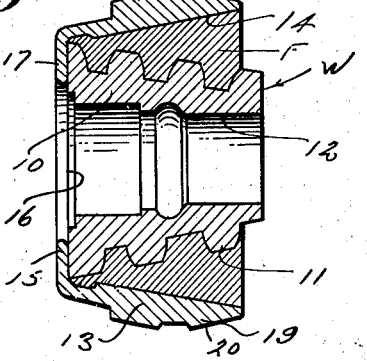

The various objects and features of my invention will be fully understood from the following detailed description of a typical preferred manner of carrying out the method of my invention, throughout which description reference is made to the accompanying drawings, in which:

Fig. 1 is a general view of a unit of apparatus used in carrying out the present invention showing the general arrangement and relationship of parts, certain of the parts being shown in section. Fig. 2 is a side view of a typical unit of work that can be handled by the method of the present invention, a part thereof being broken away to show in section. Fig. 3 is a side view of the work holder employed in carrying out the present invention, a part thereof being broken away to show in section. Fig. 4 is a sectional view illustrating a step in the method of the present invention and showing the apparatus used in carrying it out, the work being shown arranged in the holder and the holder being illustrated in the head which supports it during the filling operation. Fig. 5 is a view similar to Fig. 4 showing the work centered in the holder and the filler applied to secure the work in the holder. Fig. 6 is a sectional view of the unit formed by the work holder and the filler which mounts the work in the holder and Fig. 7 is a view illustrating a machine to which the unit of Fig. 6 may be applied for the performance of operations on the work.

By my present invention I mount work in a holder so that these parts, with the filler that mounts the work in the holder, form a unit which is firm or solid and suitable for mounting or handling in a machine such, for example, as a grinder or lathe. The particular form or nature of the holder will, in practice, vary with the size, shape or character of the work to be held and with the machine or apparatus to which the holder is to be applied or in which it is to be handled.

In the particular form of the invention and for purpose of example only I have illustrated and will refer to the work W as a cutter, such for example as a roller cutter employed in an earth boring tool. I refer to this particular work element as it presents a typical part that can be advantageously handled by the method of the invention.

The work or cutter W, as shown in the drawings, involves a body 10 of tapered cylindrical form with teeth 11 on its exterior and with finished parts 12 of various sizes and shapes at its interior. It is typical of devices of the character referred to that the teeth 11 on the exterior thereof have cutting material welded thereon and the teeth are, themselves, arranged or located on the exterior of the body so that the element as a whole may be said to be irregular, and individual cutters vary one from the other. Because of the irregularities it is impractical, if not impossible, to make a holding fixture or to employ a chuck to hold such parts without the operator exercising great skill and care in individually lining up or centering each cutter.

The parts 12 of the opening or bore through the body 10 may, for purpose of example, be considered as having been initially turned to be of approximate size, it being desired to operate on the work to accurately grind the parts 12 and it being preferred in order to expedite such grinding that certain of it be done by entering the grinding tool from one end of the cutter while the rest is done by entering the grinding tool from the other end of the cutter. If an attempt is made to thus grind a cutter such as is shown in Fig. 2 using the usual mounting fixtures or chucks, it requires double chucking or mounting of the work, that is, it requires mounting the cutter in the chuck so that one end is exposed to the grinding tool, then later mounting the cutter in the chuck so that the other end is exposed to the grinding tool. It has been found in practice that even with the exercise of great care and skill it is practically impossible to thus handle a cutter and gain accuracy of finish of the parts 12.

The holder H employed in carrying out my invention is a simple, unitary device preferably annular in form and proportioned so that its interior accommodates the cutter or work W while its exterior adapts it to a machine such as a grinder or lathe. The work holder as illustrated in Fig. 3 preferably involves an annular body 13 sufficiently large in diameter to fit around the work W with considerable clearance. The opening or bore 14 through the body 13 may be tapered, as I have shown in the drawings. An inwardly projecting flange 15 is provided at the inner or small end of the body, the inner side or face 16 of the flange being accurately finished to be normal to the longitudinal axis or central axis of the holder. The outer face or side 17 of the flange 15 is also finished to be smooth and parallel with the face 16. In the particular form of holder illustrated the bore or opening through the body is under cut at 18 adjacent the flange 15 to assure positive retention of the filler as will be hereinafter described.

The exterior of the body 13 of the holder has projecting parts that I will term ribs 19 which extend around it circumferentially and which are spaced apart axially. The outer surfaces or faces 20 of the ribs on the holder are finished to be truly concentric with the central or longitudinal axis of the holder. These surfaces 20 are preferably tapered or conical in form and the surfaces of the two ribs are oppositely pitched and they are pitched to the same degree so that they present oppositely faced or disposed seating surfaces. It will be noted that the tapered seating faces 20 on the exterior of the holder are pitched so that they are of maximum diameter at their innermost parts or ends, making the holder of maximum diameter at its middle portion and of minimum diameter at its ends so that it will readily enter the equipment hereinafter described.

In accordance with the method of the present invention I mount the cutter W on the holder H by means of a filler F to establish a unit such as I have shown in Fig. 6, and I then handle this unit in a machine such as I have shown in Fig. 7. The general steps of the method involve centering and supporting the holder H in a predetermined position, as shown in Fig. 4, then firmly holding the cutter W within the holder concentric thereto while the filler F is applied to fit between the holder and the work. It is believed that the various steps and details of the method will be best understood from a detailed description of the apparatus that I have provided and from an explanation of just how that apparatus is used in handling the work W and the holder H.

The apparatus employed in carrying out my present invention involves, generally, a head 25 to receive and hold the holder H, means 26 for centering the work W in the holder, means 27 for applying a molten filler between the holder and work, and a head 28 for handling the unit formed by the holder H, work W and filler F.

The head 25 provided for receiving and holding the holder H is a stationary or fixed part, tubular in form and vertically disposed so that it opens upwardly. The upper end portion 30 of the bore or opening in the head 25 is finished and tapered to receive one of the finished flanges 19 of the holder H. In the particular case illustrated the opening or seat 30 in the head is tapered and accurately finished to receive the tapered finished face 20 of the flange 19 located at the end of the holder which has the flange 15. It should be observed that since the flanges 19 are alike and the tapered faces 20 are alike the holder can be arranged in the seat from either end or so either of the ribs thereof rest in the seat 30.

The means 26 for centering the work W in the holder H while it is held in the head 25 includes upper and lower centers 31 and 32, respectively. The lower center 32 is an upwardly and inwardly tapered member on the upper end of a stem 33 carried in a guide 34. The guide 34 is fixed to the frame 35 of the apparatus and its upper end supports the head 25. In the particular case illustrated the head 25 is provided at its lower end with an inturned flange 36 which is screw-threaded onto the upper end of the guide 34. The stem 35 supports the center 32 so that it projects upwardly into the head 25. In the particular form of apparatus illustrated a compression spring 37 is arranged in the guide 34 below the lower end of the stem 33 so that the center 32 is yieldingly supported to project into the head.

The work W is initially arranged in the holder H so that it is within the holder and in engagement with the center 32, but is slightly spaced above the inner side 16 of the flange provided on the inner or small end of the holder. This initial positioning of the work W in the holder H while the holder is centered and held in the head 25 is shown in Fig. 4 of the drawings.

The upper center 31 is located in alignment with the lower center 32 and is arranged above the lower center. The upper center 31 is downwardly and inwardly tapered to enter the upper end of the work while it is in the holder H. The upper center may be formed or provided on the lower end of a stem 40 slidably mounted in a cylinder 41 supported by the flange 35 to be concentric with the guide 34. The stem 40 being slidably supported in the cylinder 41 can be moved down into engagement with the work while it is located in the holder supported in the head so that the two centers cooperate to firmly support and center the cutter or work within the holder with the end of the work seated on the flange 15 of the holder.

In practice various means may be provided for operating or reciprocating the stem 40 to obtain the desired action. In the particular case illustrated I have shown a fluid pressure means for this purpose. Suitable operating fluid is supplied through a line 50 to the upper end of the cylinder 41 so that it acts on the upper end of a piston 51 attached to the upper end of a stem 40 within the cylinder 41. A suitable control valve 52 is provided under control of an operating member 53 so that fluid can be admitted to and exhausted from the upper end of the cylinder, if desired. In the case illustrated I have provided a return spring 54 for moving the stem 40 upwardly when fluid is exhausted from the upper end of the cylinder 41.

With the mechanism just described when fluid from the supply line 50 is admitted above the piston 51 the stem 40 is forced downwardly so that it enters and engages the upper end of the work W and forces the work down in the holder against the resistance of the spring 37 until the bottom end of the work rests on the inner side 16 of the flange 15 of the holder.

In accordance with the method of my invention the work W is set or made fast in the centered position within the holder, as above described, by the application of a filler F between the interior of the holder and the exterior of the work. This filler is applied or introduced into the space between the holder and work in a molten state and it is such as to solidify or be solid at normal temperatures.

In practice I may employ various materials, compositions or alloys as the filler F. I prefer to employ a material which sets or solidifies into a solid, firm and strong body which is rigid and thus operates to set the work in the holder so it cannot shift. To avoid looseness I prefer to employ a material that does not shrink appreciably in cooling or in solidifying, as otherwise looseness might develop between the work and the holder.

In practice I have employed an alloy of bismuth, lead, cadmium and tin as the material for the filler, the particular composition used in practice having a melting point of about 180° F. which is less than the drawing temperature of work such as heat treated steel. Such alloy is melted easily and with the application of very little heat and yet is set or is in the solid form at normal temperatures at which it is desired to handle the work.

The means 27 for applying the molten filler between the holder and the work involves, generally, a heater A for the filler and a spout B for communicating the filler from the heater to the holder. The heater A may, in practice, vary widely in form and construction. In the particular case illustrated I have shown the heater as a unit separate from the frame 35 of the apparatus and supported by a guide 60 so it can be bodily moved vertically by means of a screw 61 under control of an operating means 62.

The heater A, as illustrated, involves, generally, a melting pot 63, a burner 64 under the melting pot, and a control for supplying the molten filler from the pot 63 to the spout B.

The control, as illustrated, involves a riser 70 located at one side of the melting pot, a connection 71 between the bottom of the melting pot and the bottom of the riser, a pivotal connection 72 between the inlet end of the spout B and a point at the side of the riser slightly above the normal level of filler in the pot 63, and a displacement member 74 for displacing the filler in the melting pot so it rises in the riser to flow into the spout.

The displacement member 74 may be located in the melting pot 63 and may be operated from a hand lever 75 through a rod 76 at the exterior of the heater which connects with a rod 77 that extends downwardly into the melting pot to the member 73.

The pivotal connection 72 supports the spout B so that it can be swung to any desired position. Normally the spout B is left so that it extends upwardly at a slight angle from the pivotal connection 72, as shown in Fig. 1. The outer end or tip 80 of the spout is shaped to discharge into the holder H when the spout B is depressed or moved downwardly to a position where the filler material from the riser will flow through the spout.

In operating the heater and mechanism just described the burner 64 is operated to keep the material or filler in pot 63 in a molten state and heat from the burner also keeps the riser 70 hot so that filler herein stays in the molten state. A suitable jacket 85 around the heated parts holds the heat so that the filler is readily maintained in the desired fluid state.

When it is desired to discharge filler from the heater A to the holder H, while the holder is in the head 25 and a unit of work W is held and centered in the holder, the operator, if there is sufficient level of filler in the riser 70, may simply lower the spout B from a position such as is shown in Fig. 1 enough to allow filler to run from the riser through the spout so it discharges into the holder. In practice I have found it practical to have the level of filler in the riser normally below the point where the spout connects to the riser. Flow of filler through the spout is effected by operating lever 75 to lower the displacement member 74 and thus increase the level of filler in the riser so the filler flows out through the spout.

When the desired amount of filler F has been poured into the holder H or when a substantial body of filler has been poured between the holder and the work the flow of filler is stopped by raising the spout B. The mass of metal presented by the holder and the work serves to rapidly chill the molten filler applied between the work and the holder so that it solidifies quickly. The moment the filler has solidified the means 26 may be released and the holder with the work set therein can be removed from the head 25.

The unit formed as just described and which is illustrated in Fig. 6 may then be placed in any suitable machine or unit of apparatus as circumstances require. In the case illustrated in the drawings I show in Fig. 7 a unit such as is shown in Fig. 6 applied to a mounting head 25 of a grinding machine. The grinding machine is shown in a general way as involving a spindle 91 which supports and rotates the head 25 so that the holder H mounted therein is rotated. A grinder spindle 92 projects from a support 93 and carries a grinding wheel 94. The spindle 92 may be fed into the opening in the work required to be finished.

When the surfaces accessible from one end of the work unit have been finished the holder can be removed from the head 25 and reversed as to position or turned end for end, making the other end of the work accessible and convenient for the grinder. The details of the head 25 and the manner in which it cooperates with the holder H are more fully set forth and are the subject of my co-pending application entitled "Device for handling work in a machine or the like," filed May 22, 1944, Serial No. 536,753. The apparatus disclosed herein is more particularly described and is claimed in my copending application entitled "Apparatus for mounting work in a holder," filed February 10, 1945, Serial No. 577,316.

Following the desired operations on the work W the holder with the work set therein is subjected to sufficient heat to melt the filler F with the result that the filler flows from between the holder and the work leaving the work finished and leaving the holder available for reuse. By using a filler F such as I have referred to above, which melts at a fairly low temperature, ordinary metal parts can be handled without injuring them in any way, that is without drawing any temper or without discoloring them in any way. Further, by using an alloy such as I have referred to the filler melts away from the work, leaving it absolutely clean and in the same state that it was when inserted in the holder originally.

Having described only a typical manner of carrying out the method of my invention, I do not wish to be limited or restricted to the specific details herein set forth, but wish to reserve to myself any variations or modifications that may appear to those skilled in the art and fall within the scope of the following claims.

Having described my invention, I claim:

1. The method of mounting a unit of work having a central opening in a tubular holder including, supporting the holder in a vertical position closing the lower end of the holder by locating the work unit to seat therein centralizing the work by introducing a center into the opening of the work unit at the holder, and then pouring a filler into the holder to solidify in the holder and around the exterior only of the work.

2. The method of mounting a unit of work having a central opening therethrough in a tubular holder including, holding the holder in a predetermined vertical position closing the lower end of the holder by seating the work unit therein, applying centering clamps to the ends of the opening in the work unit, then pouring a molten filler into the holder around the work clear of both ends of the work, and allowing the filler to solidify in the holder.

EDWARD E. STEVENSON.

REFERENCES CITED

The following references are of record in the file of this patent:

UNITED STATES PATENTS

| Number | Name | Date |
|---|---|---|
| 995,537 | Hertner et al. | June 20, 1911 |
| 1,551,342 | Steenstrup | Aug. 25, 1925 |
| 1,665,445 | Conrad | Apr. 10, 1928 |
| 1,952,373 | Hill | Mar. 27, 1934 |
| 2,110,530 | Saives | Mar. 8, 1938 |
| 2,121,435 | Koehler | June 21, 1938 |
| 2,255,184 | Osenberg | Sept. 6, 1941 |
| 2,285,014 | Butler | June 2, 1942 |
| 2,328,302 | Simison | Aug. 31, 1943 |
| 2,355,853 | Foxon | Aug. 15, 1944 |

FOREIGN PATENTS

| Number | Country | Date |
|---|---|---|
| 553,814 | Great Britain | June 7, 1943 |